US010441925B2

(12) United States Patent
Weber et al.

(10) Patent No.: US 10,441,925 B2
(45) Date of Patent: Oct. 15, 2019

(54) PROCESS FOR MAKING MEMBRANES

(71) Applicant: BASF SE, Ludwigshafen (DE)

(72) Inventors: Martin Weber, Maikammer (DE); Nicole Janssen, Gau-Odernheim (DE); Hartwig Voss, Frankenthal (DE); Jacek Malisz, Limburgerhof (DE); Martin Heijnen, Landsberg am Lech (DE); Edoardo Menozzi, Wettingen (CH)

(73) Assignee: BASF SE, Ludwigshafen (DE)

( * ) Notice: Subject to any disclaimer, the term of this patent is extended or adjusted under 35 U.S.C. 154(b) by 201 days.

(21) Appl. No.: 15/502,896

(22) PCT Filed: Jul. 30, 2015

(86) PCT No.: PCT/EP2015/067554
§ 371 (c)(1),
(2) Date: Feb. 9, 2017

(87) PCT Pub. No.: WO2016/023765
PCT Pub. Date: Feb. 18, 2016

(65) Prior Publication Data
US 2017/0239627 A1 Aug. 24, 2017

(30) Foreign Application Priority Data

Aug. 12, 2014 (EP) ..................................... 14180703

(51) Int. Cl.
| | | |
|---|---|---|
| *B01D 71/80* | (2006.01) | |
| *C08G 75/23* | (2006.01) | |
| *C08J 3/00* | (2006.01) | |
| *C02F 1/44* | (2006.01) | |
| *A23L 2/74* | (2006.01) | |
| *B01D 67/00* | (2006.01) | |
| *B01D 71/52* | (2006.01) | |
| *B01D 71/68* | (2006.01) | |
| *C02F 103/08* | (2006.01) | |

(52) U.S. Cl.
CPC ................ *B01D 71/80* (2013.01); *A23L 2/74* (2013.01); *B01D 67/0011* (2013.01); *B01D 67/0016* (2013.01); *B01D 71/52* (2013.01); *B01D 71/68* (2013.01); *C02F 1/44* (2013.01); *C08G 75/23* (2013.01); *C08J 3/005* (2013.01); *A23V 2002/00* (2013.01); *B01D 2325/02* (2013.01); *B01D 2325/20* (2013.01); *B01D 2325/22* (2013.01); *C02F 2103/08* (2013.01); *C08G 2340/00* (2013.01); *C08J 2381/06* (2013.01); *C08J 2481/06* (2013.01)

(58) Field of Classification Search
CPC .... B01D 71/80; B01D 67/0011; B01D 71/68; B01D 71/52; B01D 67/0016; B01D 2325/22; B01D 2325/02; B01D 2325/20; C08G 75/23; C08G 2340/00; C08J 3/005; C08J 2381/06; C08J 2481/06; A23L 2/74; C02F 1/44; C02F 2103/08; A23V 2002/00

See application file for complete search history.

(56) References Cited

U.S. PATENT DOCUMENTS

| | | | |
|---|---|---|---|
| 4,387,187 A * | 6/1983 | Newton | A61K 9/2853 525/403 |
| 4,870,153 A | 9/1989 | Matzner et al. | |
| 5,342,869 A * | 8/1994 | Stoll | C07F 9/4021 524/117 |
| 5,362,859 A * | 11/1994 | Zale | C07K 1/22 525/54.1 |
| 5,700,902 A * | 12/1997 | Hancock | B01D 67/0011 521/50 |
| 5,700,903 A * | 12/1997 | Hancock | B01D 67/0011 521/50 |
| 5,798,437 A * | 8/1998 | Hancock | C08L 71/00 264/219 |
| 5,834,583 A * | 11/1998 | Hancock | B01D 67/0011 528/499 |
| 5,861,471 A | 1/1999 | Pudleiner et al. | |
| 5,911,880 A * | 6/1999 | Klein | B01D 67/0011 210/493.1 |
| 5,969,082 A | 10/1999 | Kuwahara et al. | |

(Continued)

FOREIGN PATENT DOCUMENTS

| | | |
|---|---|---|
| EP | 0 113 112 A1 | 7/1984 |
| EP | 0 135 130 A2 | 3/1985 |

(Continued)

OTHER PUBLICATIONS

International Search Report and Written Opinion dated Nov. 5, 2015 in PCT/EP2015/067554.
International Preliminary Report on Patentability and Written Opinion dated Feb. 23, 2017 in PCT/EP2015/067554.
Yuan-Ping R. Ting, et al., "Preparation of Polysulfone/Poly(ethylene oxide) Block Copolymers", Macromolecules, vol. 29, Issue 23, 1996, pp. 7619-7621.
U.S. Appl. No. 14/888,570, filed Nov. 2, 2015, US 2016-0075850 A1, Martin Weber, et al.
U.S. Appl. No. 14/888,563, filed Nov. 2, 2015, US 2016-0108178 A1, Martin Weber, et al.
U.S. Appl. No. 14/895,848, filed Dec. 3, 2015, US 2016-0114296 A1, Martin Weber, et al.

(Continued)

*Primary Examiner* — Pamela H Weiss
(74) *Attorney, Agent, or Firm* — Oblon, McClelland, Maier & Neustadt, L.L.P.

(57) ABSTRACT

Process for making a membrane M comprising the following steps: a) preparing a copolymer C, wherein said copolymer C comprises blocks of at least one polyarylene ether A and blocks of polyalkylene oxide PAO, wherein the content of polyethyleneoxide in copolymer C is 30 to 90% by weight and wherein copolymer C is prepared in a solvent L to yield solution S; b) providing a dope solution D comprising at least one polymer P; c) mixing solution S and dope solution D; d) preparing a membrane by bringing the mixture of solution S and dope solution D into contact with at least one coagulating agent.

15 Claims, No Drawings

(56) References Cited

U.S. PATENT DOCUMENTS

| | | | |
|---|---|---|---|
| 6,103,796 A * | 8/2000 | Staniek | C07F 9/025 252/400.24 |
| 6,166,168 A | 12/2000 | Kuwahara et al. | |
| 2003/0141251 A1* | 7/2003 | Ji | B01D 67/0011 210/653 |
| 2004/0050791 A1* | 3/2004 | Herczeg | B01D 61/145 210/651 |
| 2004/0213985 A1* | 10/2004 | Lee | B01D 67/0009 428/315.7 |
| 2008/0051514 A1* | 2/2008 | Schwab | C08G 75/23 525/132 |
| 2008/0203012 A1* | 8/2008 | Yeager | B01D 61/025 210/500.36 |
| 2009/0127186 A1* | 5/2009 | Mizomoto | B01D 67/0011 210/483 |
| 2010/0197859 A1* | 8/2010 | Weber | B01D 67/0011 525/54.3 |
| 2013/0035457 A1* | 2/2013 | Weber | C08G 65/48 525/534 |
| 2013/0277318 A1* | 10/2013 | Weber | B01D 71/68 210/767 |

FOREIGN PATENT DOCUMENTS

| | | | |
|---|---|---|---|
| EP | 0 297 363 A2 | 1/1989 | |
| EP | 0 739 925 A2 | 10/1996 | |
| EP | 0 781 795 A2 | 7/1997 | |
| EP | 0781795 A3 * | 12/1997 | B01D 67/0088 |
| EP | 0 937 492 A2 | 8/1999 | |
| EP | 1589057 A2 * | 10/2005 | B01D 71/68 |
| EP | 1 743 690 A1 | 1/2007 | |
| EP | 2 008 704 A1 | 12/2008 | |
| EP | 2 158 958 A1 | 3/2010 | |
| EP | 2 554 564 A1 | 2/2013 | |
| WO | WO 97/05190 A1 | 2/1997 | |
| WO | WO 97/22406 A1 | 6/1997 | |
| WO | WO-9722406 A1 * | 6/1997 | B01D 67/0011 |
| WO | WO-2006012453 A1 * | 2/2006 | B01D 71/80 |
| WO | WO 2010/121628 A1 | 10/2010 | |

OTHER PUBLICATIONS

U.S. Appl. No. 14/888,316, filed Oct. 30, 2015, US 2016-0075833 A1, Martin Weber, et al.

* cited by examiner

PROCESS FOR MAKING MEMBRANES

The present invention is related to processes for making membranes M comprising the following steps:
a) preparing a copolymer C, wherein said copolymer C comprises blocks of at least one polyarylene ether A and blocks of polyalkylene oxide PAO, wherein the content of polyalkylene oxide PAO in copolymer C is 30 to 90% by weight and wherein copolymer C is prepared in a solvent L to yield solution S;
b) providing a dope solution D comprising at least one polymer P;
c) mixing solution S and dope solution D;
d) preparing a membrane by bringing the mixture of solution S and dope solution D into contact with at least one coagulating agent.

Polyether sulfones and polysulfones belong to the group of high-performance thermoplastics (E. M. Koch, H.-M. Walter, Kunststoffe 80 (1990) 1146; E. Döring, Kunststoffe 80 (1990), 1149). Owing to their good biocompatibility, polyether sulfones and polysulfones are also used as material for the production of dialysis membranes (S. Savariar, G. S. Underwood, E. M. Dickinson, P. J. Schielke, A. S. Hay, Desalination 144 (2002) 15).

The preparation of the polyether sulfones and polysulfones is usually effected by polycondensation of suitable monomer building blocks in dipolar aprotic solvents at elevated temperature (R. N. Johnson et al., J. Polym. Sci. A-1 5 (1967) 2375, J. E. McGrath et al., Polymer 25 (1984) 1827).

The preparation of polyarylene ether sulfones from suitable aromatic bishalosulfones and aromatic bisphenols or salts thereof in the presence of at least one alkali metal or ammonium carbonate or bicarbonate in an aprotic solvent is described, for example, in U.S. Pat. No. 4,870,153, EP 113 112, EP-A 297 363 and EP-A 135 130.

One disadvantage of pure polyarylene ethers is their low hydrophilicity. To enhance the hydrophilicity of polyarylene ethers, polyethersulfone (PESU)—polyethyleneoxide (PEO) block copolymers have been prepared.

The synthesis of polyarylene ether-polyalkylene oxide copolymers described in Macromolecules 29 (23) p. 7619 (1996) requires long reaction times.

EP 739 925, U.S. Pat. Nos. 5,700,902 and 5,700,903 also describe polyarylene ether and polyalkylene oxide copolymers.

U.S. Pat. No. 5,700,902 discloses block copolymers with hydrophobic blocks and hydrophilic blocks, wherein hydrophilic blocks can be PEO blocks that are endcapped on one side with an alkyl group.

U.S. Pat. Nos. 5,798,437, 5,834,583, WO 97/22406 disclose processes for the manufacture of hydrophilic copolymers.

U.S. Pat. No. 5,911,880 discloses membranes made of polyether sulfone comprising an amphiphilic additive.

EP 739 925 A1 discloses polysulfone-polyether block copolycondensates.

A method for preparing UF membranes in a phase inversion process is disclosed in H. Strathmann, K. Kock, P. Aimar, R. W. Baker Desalination 16 (1975), 179.

As it turned out, membranes comprising copolymers of arylene ethers comprising high amounts of polyalkyleneoxides that were prepared from such copolymers in isolated form have drawbacks with respect to their mechanical strength.

It was an objective of the present invention to provide a process for making membranes with a high hydrophilicity on the surface that at the same time have a high glass transition temperature and good mechanical strength.

The objective was solved by processes according to claim 1.

In the context of this application a membrane shall be understood to be a thin, semipermeable structure capable of separating two fluids or separating molecular and/or ionic components or particles from a liquid. A membrane acts as a selective barrier, allowing some particles, substances or chemicals to pass through, while retaining others.

For example, membranes M can be reverse osmosis (RO) membranes, forward osmosis (FO) membranes, nanofiltration (NF) membranes, ultrafiltration (UF) membranes or microfiltration (MF) membranes. These membrane types are generally known in the art and are further described below.

Suitable copolymers C comprise blocks of at least one polyarylene ether A and blocks of at least one polyalkylene oxide PAO.

Suitable polyarylene ethers A are known as such to those skilled in the art and can be formed from polyarylene ether units of the general formula IV $$\left[ D-Ar-(T-\underset{}{\bigcirc})_t-O-\underset{}{\bigcirc}-Y-(Ar^1-Q)_q-\underset{}{\bigcirc} \right]$$
(IV)

with the following definitions:
t, q: each independently 0, 1, 2 or 3,
Q, T, Y: each independently a chemical bond or group selected from —O—, —S—, —SO$_2$—, S=O, C=O, —N=N—, —CR$^a$R$^b$— where R$^a$ and R$^b$ are each independently a hydrogen atom or a C$_1$-C$_{12}$-alkyl, C$_1$-C$_{12}$-alkoxy or C$_6$-C$_{18}$-aryl group, where at least one of Q, T and Y is not —O—, and at least one of Q, T and Y is —SO$_2$—, and
Ar, Ar$^1$: each independently an arylene group having from 6 to 18 carbon atoms.
D: a chemical bond or —O—
In particular, D is an oxygen atom —O— when bound to another arylene ether unit. D is a chemical bond when bound to a polyalkyleneoxide block.

The polyarylene ethers are typically prepared by polycondensation of suitable starting compounds in dipolar aprotic solvents at elevated temperature (see, for example, R. N. Johnson et al., J. Polym. Sci. A-1 5 (1967) 2375, J. E. McGrath et al., Polymer 25 (1984) 1827).

Suitable polyarylene ether blocks can be provided by reacting at least one starting compound of the structure X—Ar—Y (M1) with at least one starting compound of the structure HO—Ar$^1$—OH (M2) in the presence of a solvent (L) and of a base (B), where
Y is a halogen atom,
X is selected from halogen atoms and OH, preferably from halogen atoms, especially F, Cl or Br, and
Ar and Ar$^1$ are each independently an arylene group having 6 to 18 carbon atoms.

In one embodiment, a polyarylene ether which is formed from units of the general formula IV with the definitions as above is provided in the presence of a solvent (L):

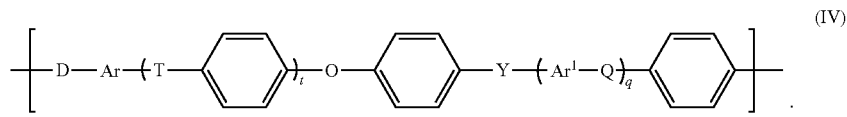

If Q, T or Y, with the abovementioned prerequisites, is a chemical bond, this is understood to mean that the group adjacent to the left and the group adjacent to the right are bonded directly to one another via a chemical bond.

Preferably, Q, T and Y in formula (IV), however, are independently selected from —O— and —SO$_2$—, with the proviso that at least one of the group consisting of Q, T and Y is —SO$_2$—.

When Q, T or Y are —CR$^a$R$^b$—, R$^a$ and R$^b$ are each independently a hydrogen atom or a C$_1$-C$_{12}$-alkyl, C$_1$-C$_{12}$-alkoxy or C$_6$-C$_{18}$-aryl group.

Preferred C$_1$-C$_{12}$-alkyl groups comprise linear and branched, saturated alkyl groups having from 1 to 12 carbon atoms. Particularly preferred C$_1$-C$_{12}$-alkyl groups are: C$_1$-C$_6$-alkyl radicals such as methyl, ethyl, n-propyl, isopropyl, n-butyl, sec-butyl, 2- or 3-methylpentyl and longer-chain radicals such as unbranched heptyl, octyl, nonyl, decyl, undecyl, lauryl, and the singularly or multiply branched analogs thereof.

Useful alkyl radicals in the aforementioned usable C$_1$-C$_{12}$-alkoxy groups include the alkyl groups having from 1 to 12 carbon atoms defined above. Cycloalkyl radicals usable with preference comprise especially C$_3$-C$_{12}$-cycloalkyl radicals, for example cyclopropyl, cyclobutyl, cyclopentyl, cyclohexyl, cycloheptyl, cyclooctyl, cyclopropylmethyl, cyclopropylethyl, cyclopropylpropyl, cyclobutylmethyl, cyclobutylethyl, cyclpentylethyl, -propyl, -butyl, -pentyl, -hexyl, cyclohexylmethyl, -dimethyl, -trimethyl.

Ar and Ar$^1$ are each independently a C$_6$-C$_{18}$-arylene group. Proceeding from the starting materials described below, Ar is preferably derived from an electron-rich aromatic substance which is preferably selected from the group consisting of hydroquinone, resorcinol, dihydroxynaphthalene, especially 2,7-dihydroxynaphthalene, and 4,4'-bisphenol. Ar$^1$ is preferably an unsubstituted C$_6$- or C$_{12}$-arylene group.

Useful C$_6$-C$_{18}$-arylene groups Ar and Ar$^1$ are especially phenylene groups, such as 1,2-, 1,3- and 1,4-phenylene, naphthylene groups, for example 1,6-, 1,7-, 2,6- and 2,7-naphthylene, and the arylene groups derived from anthracene, phenanthrene and naphthacene.

Preferably, Ar and Ar$^1$ in the preferred embodiments of the formula (IV) are each independently selected from the group consisting of 1,4-phenylene, 1,3-phenylene, naphthylene, especially 2,7-dihydroxynaphthalene, and 4,4'-bisphenylene.

Units present with preference within the polyarylene ether are those which comprise at least one of the following repeat structural units IVa to IVo, wherein D has the same meaning as defined above:

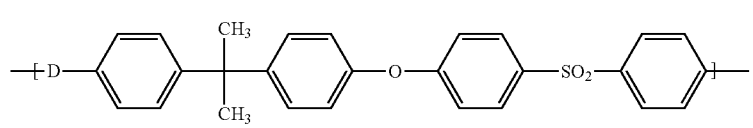

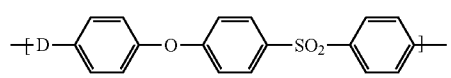
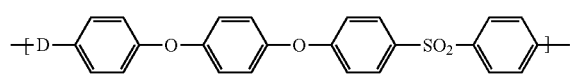

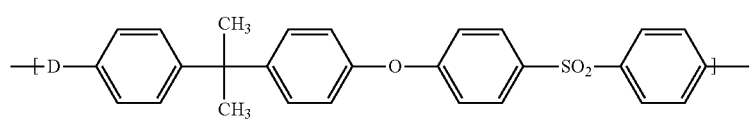

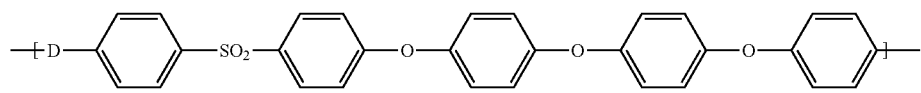

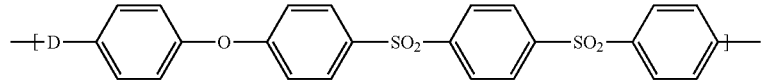

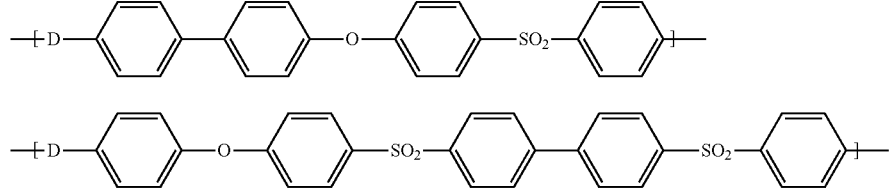

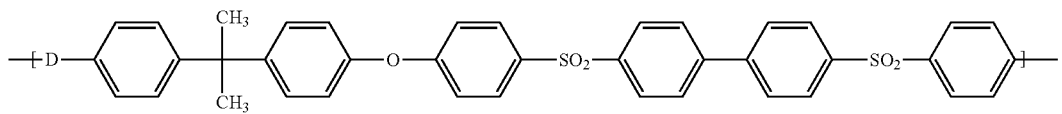

IVi

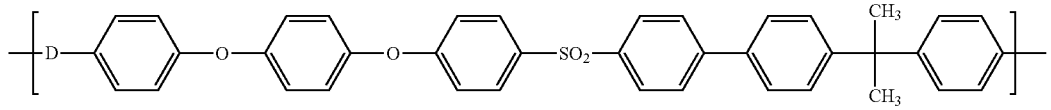

IVj

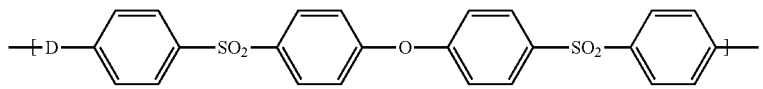

IVk

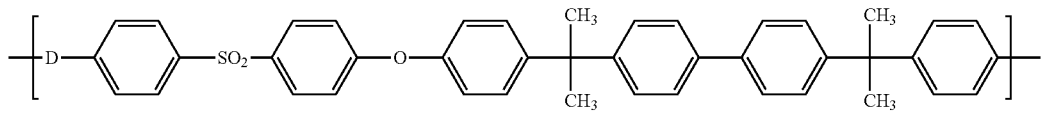

IVl

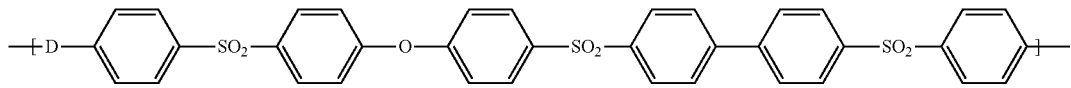

IVm

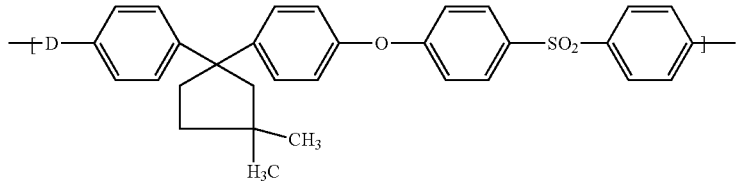

IVn

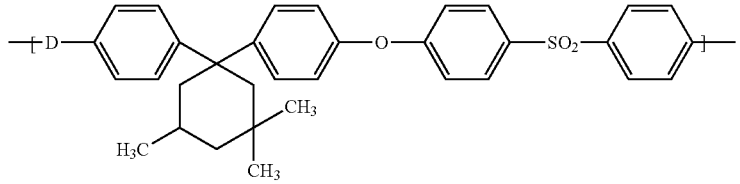

IVo

In addition to the units IVa to IVo present with preference, preference is also given to those units in which one or more 1,4-dihydroxyphenyl units are replaced by resorcinol or dihydroxynaphthalene units.

Particularly preferred units of the general formula IV are units IVa, IVg and IVk. It is also particularly preferred when the polyarylene ether blocks are formed essentially from one kind of units of the general formula IV, especially from one unit selected from IVa, IVg and IVk.

In a particularly preferred embodiment, Ar=1,4-phenylene, t=1, q=0, T=$SO_2$ and Y=$SO_2$. Such polyarylene ethers are referred to as polyether sulfone (PESU).

Suitable polyarylene ether blocks A preferably have a mean molecular weight Mn (number average) in the range from 1000 to 70000 g/mol, especially preferably 2000 to 40000 g/mol and particularly preferably 2500 to 30000 g/mol. The average molecular weight of the polyarylene ether blocks can be controlled and calculated by the ratio of the monomers forming the polyarylene ether blocks, as described by H. G. Elias in "An Introduction to Polymer Science" VCH Weinheim, 1997, p. 125.

Suitable starting compounds are known to those skilled in the art and are not subject to any fundamental restriction, provided that the substituents mentioned are sufficiently reactive within a nucleophilic aromatic substitution.

Preferred starting compounds are difunctional. "Difunctional" means that the number of groups reactive in the nucleophilic aromatic substitution is two per starting compound. A further criterion for a suitable difunctional starting compound is a sufficient solubility in the solvent, as explained in detail below.

Preference is given to monomeric starting compounds, which means that the reaction is preferably performed proceeding from monomers and not proceeding from prepolymers.

The starting compound (M1) used is preferably a dihalodiphenyl sulfone. The starting compound (M2) used is preferably dihydroxydiphenyl sulfone.

Suitable starting compounds (M1) are especially dihalodiphenyl sulfones such as 4,4'-dichlorodiphenyl sulfone, 4,4'-difluorodiphenyl sulfone, 4,4'-dibromodiphenyl sulfone, bis(2-chlorophenyl) sulfones, 2,2'-dichlorodiphenyl sulfone and 2,2'-difluorodiphenyl sulfone, particular preference being given to 4,4'-dichlorodiphenyl sulfone and 4,4'-difluorodiphenyl sulfone.

Preferred compounds (M2) are accordingly those having two phenolic hydroxyl groups.

Phenolic OH groups are preferably reacted in the presence of a base in order to increase the reactivity toward the halogen substituents of the starting compound (M1).

Preferred starting compounds (M2) having two phenolic hydroxyl groups are selected from the following compounds:

dihydroxybenzenes, especially hydroquinone and resorcinol;

dihydroxynaphthalenes, especially 1,5-dihydroxynaphthalene, 1,6-dihydroxynaphthalene, 1,7-dihydroxynaphthalene, and 2,7-dihydroxynaphthalene;

dihydroxybiphenyls, especially 4,4'-biphenol and 2,2'-biphenol;

bisphenyl ethers, especially bis(4-hydroxyphenyl) ether and bis(2-hydroxyphenyl) ether;

bisphenylpropanes, especially 2,2-bis(4-hydroxyphenyl)propane, 2,2-bis(3-methyl-4-hydroxyphenyl)propane and 2,2-bis(3,5-dimethyl-4-hydroxyphenyl)propane;

bisphenylmethanes, especially bis(4-hydroxyphenyl)methane;

bisphenyl sulfones, especially bis(4-hydroxyphenyl) sulfone;

bisphenyl sulfides, especially bis(4-hydroxyphenyl) sulfide;

bisphenyl ketones, especially bis(4-hydroxyphenyl) ketone;

bisphenylhexafluoropropanes, especially 2,2-bis(3,5-dimethyl-4-hydroxyphenyl)hexafluoropropane; and bisphenylfluorenes, especially 9,9-bis(4-hydroxyphenyl) fluorene;

1,1-Bis(4-hydroxyphenyl)-3,3,5-trimethyl-cyclohexane (bisphenol TMC).

It is preferable, proceeding from the aforementioned aromatic dihydroxyl compounds (M2), by addition of a base (B), to prepare the dipotassium or disodium salts thereof and to react them with the starting compound (M1). The aforementioned compounds can additionally be used individually or as a combination of two or more of the aforementioned compounds.

Hydroquinone, resorcinol, dihydroxynaphthalene, especially 2,7-dihydroxynaphthalene, bisphenol A, dihydroxydiphenyl sulfone and 4,4'-bisphenol are particularly preferred as starting compound (M2).

However, it is also possible to use trifunctional compounds. In this case, branched structures are the result. If a trifunctional starting compound (M2) is used, preference is given to 1,1,1-tris(4-hydroxyphenyl)ethane.

The ratios to be used derive in principle from the stoichiometry of the polycondensation reaction which proceeds with theoretical elimination of hydrogen chloride, and are established by the person skilled in the art in a known manner.

In a preferred embodiment, the ratio of halogen end groups to phenolic end groups is adjusted by controlled establishment of an excess of the dihalogen starting compound (M1) in relation to a difunctional compound (M2) as starting compound and polyalkyleneoxide PAO.

More preferably, the molar (M1)/(M2) ratio in this embodiment is from 1.001 to 1.7, even more preferably from 1.003 to 1.5, especially preferably from 1.005 to 1.3, most preferably from 1.01 to 1.1.

Preferably, the molar ratio (M1)/(M2+polyalkyleneoxide PAO) is 1.000 to 1.25, more preferably 1.005 to 1.2.

Alternatively, it is also possible to use a starting compound (M1) where X=halogen and Y=OH. In this case, the ratio of halogen to OH end groups used is preferably from 1.001 to 1.7, more preferably from 1.003 to 1.5, especially from 1.005 to 1.3, most preferably 1.01 to 1.251.

Preferably, the conversion in the polycondensation is at least 0.9, which ensures a sufficiently high molecular weight.

Solvents (L) preferred in the context of the present invention are organic, especially aprotic polar solvents.

Suitable solvents also have a boiling point in the range from 80 to 320° C., especially 100 to 280° C. at atmospheric pressure, preferably from 150 to 250° C. Suitable aprotic polar solvents are, for example, high-boiling ethers, esters, ketones, asymmetrically halogenated hydrocarbons, anisole, dimethylformamide, dimethyl sulfoxide, sulfolane, N-methyl-2-pyrrolidone and/or N-ethyl-2-pyrrolidone. It is also possible to use mixtures of these solvents.

A preferred solvent L is especially N-methyl-2-pyrrolidone and/or N-ethyl-2-pyrrolidone, especially N-methyl-2-pyrrolidone.

Preferably, the starting compounds (M1) and (M2) and polyalkyleneoxide PAO are reacted in the aprotic polar solvents (L) mentioned, especially N-methyl-2-pyrrolidone.

Suitable blocks of polyalkylene oxide PAO comprise at least one alkylene oxide in polymerized form.

Examples of alkylene oxides include ethylene oxide (EO), propylene oxide (PO), butylene oxide (BO), styrene oxide (SO) and tetrahydrofurane (THF).

Preferably, said at least one alkylene oxide is selected from ethylene oxide, propylene oxide, butylene oxide and tetrahydrofurane, especially preferably EO and PO.

Normally polyalkylene oxide PAO comprise ethylene oxide units —$(CH_2)_2$—O— and/or propylene oxide units —$CH_2$—$CH(CH_3)$—O—, as main components, while higher alkylene oxide units, i.e. those having more than 3 carbon atoms, are present only in small amounts in order to fine-tune the properties.

Preferably polyalkylene oxide PAO comprise ethylene oxide units —$(CH_2)_2$—O— the as main component, while higher alkylene oxide units, i.e. those having more than 2 carbon atoms, are present only in small amounts in order to fine-tune the properties.

Blocks of polyalkylene oxide PAO may be random copolymers, gradient copolymers, alternating or block copolymers comprising ethylene oxide and propylene oxide units. The amount of higher alkylene oxide units having more than 3 carbon atoms normally does not exceed 10% by weight, preferably 5% by weight.

The blocks of polyalkylene oxide PAO are obtainable in a manner known in principle, for example, by polymerizing alkylene oxides and/or cyclic ethers having at least 3 carbon atoms and also, optionally, further components. They may additionally be prepared by polycondensing dialcohols and/or polyalcohols, suitable starters, and also, optionally, further monomeric components.

Examples of suitable alkylene oxides as monomers for blocks of polyalkylene oxide PAO comprise ethylene oxide and propylene oxide and also 1-butene oxide, 2,3-butene oxide, 2-methyl-1,2-propene oxide (isobutene oxide), 1-pentene oxide, 2,3-pentene oxide, 2-methyl-1,2-butene-oxide, 3-methyl-1,2-butene oxide, 2,3-hexene oxide, 3,4-hexene oxide, 2-methyl-1,2-pentene oxide, 2-ethyl-1,2-butene oxide, 3-methyl-1,2-pentene oxide, decene oxide, 4-methyl-1,2-pentene oxide, styrene oxide, or be formed from a mixture of oxides of industrially available raffinate streams. Examples of cyclic ethers comprise tetrahydrofuran. It is of course also possible to use mixtures of different alkylene oxides. The skilled worker makes an appropriate selection from among the monomers and further components in accordance with the desired properties of the block.

The blocks of polyalkylene oxide PAO may also be branched or star-shaped. Blocks of this kind are obtainable by using starter molecules having at least 3 arms. Examples of suitable starters comprise glycerol, trimethylolpropane, pentaerythritol or ethylenediamine.

In one embodiment, polyalkylene oxide blocks PAO are homopolymers of one alkylene oxide, preferably ethylene oxide.

In one embodiment, suitable blocks of polyalkylene oxide PAO comprise only ethylene oxide and propylene oxide and the number average molar ratio of propylene oxide to ethylene oxide is from 200:1 to 1:200. In one embodiment the number average molar ratio of propylene oxide to ethylene oxide is 150:1 to 1.5:1, more preferably 100:1 to 2:1 and especially preferably 50:1 to 5:1. In another embodiment, the number average molar ratio of propylene oxide to ethylene oxide is from 40:1 to 10:1 or 35:1 to 20:1. In one embodiment the number average molar ratio of ethylene oxide to propylene oxide is 150:1 to 1.5:1, more preferably 100:1 to 2:1 and especially 50:1 to 5:1.

The synthesis of alkylene oxide blocks is known to the skilled worker. Details are given, for example, in "Polyoxyalkylenes" in Ullmann's Encyclopedia of Industrial Chemistry, 6$^{th}$ Edition, Electronic Release.

In one embodiment suitable blocks of polyalkylene oxide PAO are endcapped on one side with an alkyl or aryl group, leading to block copolymers comprising individual polymer molecules of the general structure PAO-A or PAO-A-PAO. In case polyalkyleneoxide blocks are endcapped on one side with an alkyl or aryl group, normally at least 50 mol %, preferably at least 70 mol %, more preferably at least 90 and even more preferably at least 95 mol % of all individual polymer molecules comprising a polyalkylene oxide block that are comprised in block copolymers according to the invention have the general structure PAO-A or PAO-A-PAO.

In a preferred embodiment, suitable blocks of polyalkylene oxide PAO bear an OH group in both terminal positions, leading to block copolymers that may comprise multiple polyalkyleneoxide blocks in one polymer molecule.

Suitable polyalkylene oxides can be linear or branched. Branching of a polyalkylene oxide can for example be achieved by including monomers bearing an epoxide group and an OH or a chloro moiety into the polyalkylene oxide. Preferably, suitable polyalkylene oxides are linear.

Suitable blocks of polyalkylene oxide PAO normally comprise a number average of 2.1 to 600 alkyleneoxide units. Preferably, suitable polyalkylene oxides comprise a number average 3 to 300, more preferably 5 to 150, even more preferably 10 to 100 alkylene oxide units.

Copolymers C comprise blocks of polyalkylene oxide PAO and blocks of polyarylene ether A. Preferably at least 80 mol % and more preferably at least 90 mol % and even more preferably at least 95 mol % of said polyalkylene oxide blocks PAO are covalently bound to a polyarylene ether block A. In one preferred embodiment essentially all polyalkylene oxide blocks AO are covalently bound to a polyarylene ether block A. Normally, said polyalkylene oxide blocks PAO are covalently bound to a polyarylene ether block A via an —O— group (an ether group).

Copolymers C have a content of polyalkyleneoxide PAO of 30 to 90% by weight, preferably 35 to 70% by weight, even more preferably 35 to 55% by weight.

Preferably, copolymers C comprise 30 to 90% by weight, preferably 35 to 70% by weight, even more preferably 35 to 55% by weight of polyalkyleneoxide like polyethyleneoxide and 70 to 10%, preferably 65 to 30% and even more preferably 65 to 45% by weight of at least one polyarylene ether A.

In one embodiment, suitable block copolymers comprise individual polymer molecules of the general structure PAO-A or PAO-A-PAO. Normally, at least 50 mol %, preferably at least 70 mol %, more preferably at least 90 and even more preferably at least 95 mol % of all individual polymer molecules comprising a polyalkylene oxide block that are comprised in suitable block copolymers have the general structure PAO-A or PAO-A-PAO.

In one embodiment, at least 50 mol %, more preferably at least 70 mol %, even more preferably at least 80 mol %, especially preferably at least 90 mol % and particularly preferably at least 95 mol % or at least 99 mol % of the individual polymer molecules comprised in block copolymers C comprise at least one polyalkylene oxide block PAO and at least one polyarylene ether block A.

In preferred embodiments, polyarylene oxide blocks A in block copolymers C are polysulfones, polyethersulfones or polyphenylenesulfones.

Usually, the average molecular weight Mw (determined by GPC according to the procedure given in the experimental section) of block copolymers C is 5000 to 150.000 g/mol, preferably 7500 to 100.000 g/mol, more preferably 10.000 to 50.000 g/mol.

Suitable block copolymers preferably have a polydispersity (Mw/Mn) from 1.5 to 5, more preferably 2 to 4 (determined by GPC according to the procedure given in the experimental section).

In one embodiment, copolymers C have two glass transition temperatures. For example, copolymers C may have one glass transition temperature in the range from −80 to −20° C. and one glass transition temperature in the range from 100 to 225° C. (determined by differential scanning calorimetry (DSC) as described in the experimental section).

In one embodiment, copolymers C have one glass transition temperature.

In one embodiment, copolymers C have one glass transition temperature from −50° C. to 200° C., preferably from −40° C. to 150° C.

According to the invention, copolymer C is prepared from its constituents in a solvent (L).

In a preferred embodiment for preparing copolymer C, the starting compounds (M1) and (M2) and polyalkyleneoxide are reacted in the presence of solvent (L) and preferably in the presence of a base (B) to yield solution S. Base (B) is preferably anhydrous. Suitable bases (B) are especially anhydrous alkali metal and/or alkaline earth metal carbonate, preferably sodium carbonate, potassium carbonate, calcium carbonate or mixtures thereof, very particular preference being given to potassium carbonate, especially potassium carbonate with a volume-weighted mean particle size of less than 200 micrometers, determined with a particle size measuring instrument in a suspension of N-methyl-2-pyrrolidone.

A particularly preferred combination is N-methyl-2-pyrrolidone as solvent (L) and potassium carbonate as base (B).

The reaction of the suitable starting compounds (M1) and (M2) and polyalkyleneoxide is performed at a temperature of 80 to 250° C., preferably 100 to 220° C., the upper temperature limit being determined by the boiling point of the solvent.

The reaction is effected preferably within a time interval of 2 to 12 h, especially of 3 to 8 h.

Especially suitable starting materials, bases, solvents, ratios of all components involved, reaction times and reaction parameters like temperatures and pressures as well as suitable workup procedures are for example disclosed in U.S. Pat. No. 4,870,153, col. 4, ln. 11 to col. 17, ln. 64, EP 113 112, p. 6, ln. 1 to p. 9, ln. 14, EP-A 297 363, p. 10, ln. 38 to p. 11, ln. 24, EP-A 135 130, p. 1, ln. 37 to p. 4, ln. 20, which are incorporated in this application by reference.

If desired, solution S can modified by adding further solvent or removing solvent prior to, during or after the preparation of copolymer C After the preparation of copolymer C it is advantageous to remove any inorganic components present in the mixture. Such inorganic components are for example sodium chloride that was formed during the reaction or residuals catalyst like of sodium carbonate or hydroxide. Such inorganic components can for example be removed by filtration. Preferably, no particles with an average particle size above 10 μm, preferably above 5 μm are detectable by light scattering after filtration.

In a separate step, a dope solution D is prepared for making membranes M. The dope solution D comprises a polymer P dissolved in a solvent LD.

Normally, polymer P is the main component of membrane M or the part the membrane M that is obtained in steps a) to d).

Suitable polymers P include polyamide (PA), polyvinyl-alcohol (PVA), Cellulose Acetate (CA), Cellulose Triacetate (CTA), CA-triacetate blend, Cellulose ester, Cellulose Nitrate, regenerated Cellulose, aromatic, aromatic/aliphatic or aliphatic Polyamide, aromatic, aromatic/aliphatic or aliphatic Polyimide, Polybenzimidazole (PBI), Polybenzimidazolone (PBIL), Polyacrylonitrile (PAN), PAN-poly(vinyl chloride) copolymer (PAN-PVC), PAN-methallyl sulfonate copolymer, Poly(dimethylphenylene oxide) (PPO), Polycarbonate, Polyester, Polytetrafluroethylene (PTFE), Poly(vinylidene fluoride) (PVDF), Polypropylene (PP), Polyelectrolyte complexes, Poly(methyl methacrylate) PMMA, Polydimethylsiloxane (PDMS), aromatic, aromatic/aliphatic or aliphatic polyimide urethanes, aromatic, aromatic/aliphatic or aliphatic polyamidimides, crosslinked polyimides or polyarylene ether, polysulfone (PSU), polyphenylenesulfone (PPSU), polyethersulfone (PESU), or mixtures thereof.

Preferably, polymers P are polyarylene ethers like polysulfones, polyethersulfones, polyphenylenesulfones or polyvinylidene fluoride.

In one preferred embodiment, polymer P is a polysulfone.

In one preferred embodiment, polymer P is a polyethersulfone.

In one preferred embodiment, polymer P is a polyphenylenesulfone.

Suitable solvents LD are in principle all solvents that are capable of dissolving polymer P and copolymer C in the amounts used and that allow coagulation of membrane M from the mixture of solution S and dope solution D.

Suitable solvents LD include organic, especially aprotic polar solvents. Suitable solvents LD have a boiling point in the range from 80 to 320° C. at atmospheric pressure, especially 100 to 280° C., preferably from 150 to 250° C. Suitable aprotic polar solvents are, for example, high-boiling ethers, esters, ketones, asymmetrically halogenated hydrocarbons, anisole, dimethylformamide, dimethyl sulfoxide, sulfolane, N-methyl-2-pyrrolidone and/or N-ethyl-2-pyrrolidone. It is also possible to use mixtures of these solvents.

A preferred solvent LD is especially N-methyl-2-pyrrolidone and/or N-ethyl-2-pyrrolidone, especially N-methyl-2-pyrrolidone.

Preferably solvent L and solvent LD are identical.

Rather than isolating copolymer C in substance, processes according to the invention use solution S obtained in the preparation of copolymer C to mix copolymer C and polymer P. By avoiding to isolate copolymer C in substance, membranes with improved performance with respect to their separation characteristics and mechanical strength were obtained.

In one preferred embodiment the solid content of solution S is experimentally determined prior to mixing S and D. This can for example be done by nuclear magnetic resonance methods like $^1$H-NMR as described in the experimental section.

In another embodiment the solid content on solution S is calculated from the amount of starting materials used, from the amount of solvent removed from the solution in the course of the reaction and the amount of solvent added during or after the polymerization reaction.

After providing solution S and dope solution D, solution S and dope solution D are mixed.

It is normally not relevant for carrying out the invention in which way solution S and dope solution D are mixed, as long as the mixture obtained is essentially homogenous. In one embodiment, solution S is added to dope solution D. In one embodiment, dope solution D is added to solution S. In one embodiment, solution S and dope solution D are mixed continuously and inline in a mixing and spinning orifice or spinning nozzle.

Normally solution S is mixed with dope solution D so that the mixture obtained comprises copolymer C and polymer P in a mass ratio of 1:99 to 1:3, preferably 1:50 to 1:4, more preferably 1:30 to 1:5.

After mixing solution S and dope solution D, the solution obtained is brought into contact with at least one coagulating agent to form membrane M by precipitation of polymer P and copolymer C.

Coagulation agents are known to the person skilled in the art and can be adjusted by routine experiments. In many cases the coagulation agent will be a mixture of different solvent based and/or non-solvent based coagulation agents. An example for a solvent based coagulation agent is N-methylpyrrolidone. Non-solvent based coagulation agents are for instance water, n-butanol, i-butanol, tert-butanol, n-propanol, iso-propanol, 1,2-ethandiol, neopentylglycol, 1,2-propandiol, 1,3-propandiol, trimethylolpropane.

A preferred coagulation agent is water in its liquid form or as water vapor.

Preferably, the precipitation of copolymer C and polymer P is carried out so that at least 90 mol % of copolymer C and polymer P are precipitated.

In a preferred embodiment, the precipitation of copolymer C and polymer P yields membranes M that comprise copolymer C and polymer P in identical ratio as in the mixture of solution S and dope solution D or in a ratio that differs by not more than 15%, preferably 10% from the ratio present in the mixture of D and S.

In one embodiment hollow fiber or multichannel (multi bore) membranes are manufactured by extruding a polymer, which forms a semi-permeable membrane after coagulation through an extrusion nozzle with several hollow needles. A coagulating liquid is injected through the hollow needles into the extruded polymer during extrusion, so that parallel continuous channels extending in extrusion direction are formed in the extruded polymer. Preferably the pore size on an outer surface of the extruded membrane is controlled by bringing the outer surface after leaving the extrusion nozzle in contact with a mild coagulation agent such that the shape is fixed without active layer on the outer surface and subsequently the membrane is brought into contact with a strong coagulation agent. As a result a membrane can be obtained that has an active layer inside the channels and an outer surface, which exhibits no or hardly any resistance against liquid flow. Herein suitable coagulation agents include solvents and/or non-solvents. The strength of the coagulations may be adjusted by the combination and ratio of non-solvent/solvent. Coagulation solvents are known to the person skilled in the art and can be adjusted by routine experiments. An example for a solvent based coagulation agent is N-methylpyrrolidone. Non-solvent based coagulation agents are for instance water, iso-propanol and propylene glycol.

In one embodiment, the so obtained membrane can be treated with hypochloric acid solution to remove any oxidizable components that may act as a pore forming agent.

Another aspect of the invention are membranes obtained according to processes of the invention.

Membranes M can for example be reverse osmosis (RO) membranes, forward osmosis (FO) membranes, nanofiltration (NF) membranes, ultrafiltration (UF) membranes or microfiltration (MF) membranes.

FO membranes are normally suitable for treatment of seawater, brackish water, sewage or sludge streams. Thereby pure water is removed from those streams through a FO membrane into a so called draw solution on the back side of the membrane having a high osmotic pressure.

In a preferred embodiment, suitable FO membranes are thin film composite (TFC) FO membranes. Preparation methods and use of thin film composite membranes are principally known and, for example described by R. J. Petersen in Journal of Membrane Science 83 (1993) 81-150.

In a particularly preferred embodiment, FO membranes M comprise a fabric layer, a support layer, a separation layer and optionally a protective layer. Said protective layer can be considered an additional coating to smoothen and/or hydrophilize the surface.

Said fabric layer can for example have a thickness of 10 to 500 µm. Said fabric layer can for example be a woven or nonwoven, for example a polyester nonwoven.

Said support layer of a TFC FO membrane normally comprises pores with an average pore diameter of for example 0.5 to 100 nm, preferably 1 to 40 nm, more preferably 5 to 20 nm. Said support layer can for example have a thickness of 5 to 1000 µm, preferably 10 to 200 µm. Said support layer may for example comprise as the main component a polysulfone, polyethersulfone, polyphenylenesulfone, PVDF, polyimide, polyimideurethane or cellulose acetate.

In a preferred embodiment, FO membranes comprise a support layer that is prepared using processes according to the invention.

In one preferred embodiment, suitable membranes are TFC FO membranes comprising a support layer prepared using processes according to the invention, a separation layer comprising polyamide as main component and optionally a protective layer comprising polyvinylalcohol as the main component.

In a preferred embodiment suitable FO membranes comprise a separation layer obtained from the condensation of a polyamine and a polyfunctional acyl halide. Said separation layer can for example be obtained in an interfacial polymerization process.

RO membranes are normally suitable for removing molecules and ions, in particular monovalent ions. Typically, RO membranes are separating mixtures based on a solution/diffusion mechanism.

In a preferred embodiment, suitable RO membranes M are thin film composite (TFC) RO membranes. Preparation methods and use of thin film composite membranes are principally known and, for example described by R. J. Petersen in Journal of Membrane Science 83 (1993) 81-150.

In a further preferred embodiment, suitable RO membranes comprise a fabric layer, a support layer, a separation layer and optionally a protective layer. Said protective layer can be considered an additional coating to smoothen and/or hydrophilize the surface Said fabric layer can for example have a thickness of 10 to 500 µm. Said fabric layer can for example be a woven or nonwoven, for example a polyester nonwoven.

Said support layer of a TFC RO membrane normally comprises pores with an average pore diameter of for example 0.5 to 100 nm, preferably 1 to 40 nm, more preferably 5 to 20 nm. Said support layer can for example have a thickness of 5 to 1000 µm, preferably 10 to 200 µm. Said support layer may for example comprise a main component a polysulfone, polyethersulfone, polyphenylenesulfone, PVDF, polyimide, polyimideurethane or cellulose acetate.

In one embodiment, RO membranes comprise a support layer that is prepared using processes according to the invention.

In one embodiment, suitable membranes M are TFC RO membranes comprising a nonwoven polyester fabric, a support layer obtained using processes according to the invention, a separation layer comprising polyamide as main component and optionally a protective layer comprising polyvinylalcohol as the main component.

In a preferred embodiment suitable RO membranes comprise a separation layer obtained from the condensation of a polyamine and a polyfunctional acyl halide. Said separation layer can for example be obtained in an interfacial polymerization process.

Suitable polyamine monomers can have primary or secondary amino groups and can be aromatic (e. g. a diaminobenzene, a triaminobenzene, m-phenylenediamine, p-phenylenediamine, 1,3,5-triaminobenzene, 1,3,4-triaminobenzene, 3,5-diaminobenzoic acid, 2,4-diaminotoluene, 2,4-diaminoanisole, and xylylenediamine) or aliphatic (e. g. ethylenediamine, propylenediamine, piperazine, and tris(2-diaminoethyl)amine).

Suitable polyfunctional acyl halides include trimesoyl chloride (TMC), trimellitic acid chloride, isophthaloyl chloride, terephthaloyl chloride and similar compounds or blends of suitable acyl halides. As a further example, the second monomer can be a phthaloyl halide.

In one embodiment of the invention, a separation layer of polyamide is made from the reaction of an aqueous solution of meta-phenylene diamine MPD with a solution of trimesoyl chloride (TMC) in an apolar solvent.

NF membranes are normally especially suitable for removing multivalent ions and large monovalent ions. Typically, NF membranes function through a solution/diffusion or/and filtration-based mechanism.

NF membranes are normally used in crossflow filtration processes.

In one embodiment of the invention, NF membranes M are prepared using processes according to the invention and comprise as the main component at least one polymer P selected from polysulfone, polyphenylenesulfone and/or polyethersulfone.

In one embodiment of the invention, NF membranes M are prepared using processes according to the invention and comprise as the main component at least one polymer P that is positively or negatively charged.

Nanofiltration membranes often comprise charged polymers comprising sulfonic acid groups, carboxylic acid groups and/or ammonium groups.

In another embodiment, NF membranes comprise as the main component at least one polymer P selected from polyamides, polyimides or polyimide urethanes, Polyetheretherketone (PEEK) or sulfonated polyetheretherketone (SPEEK).

UF membranes are normally suitable for removing suspended solid particles and solutes of high molecular weight, for example above 100,000 Da. In particular, UF membranes are normally suitable for removing bacteria and viruses.

UF membranes normally have an average pore diameter of 0.5 nm to 50 nm, preferably 1 to 40 nm, more preferably 5 to 20 nm.

In one embodiment of the invention, UF membranes M are prepared using processes according to the invention and comprise as the main component at least one polymer P selected from polyvinylidene fluoride, polysulfone, polyphenylenesulfone and/or polyethersulfone.

In one embodiment, UF membranes M comprise as the main component at least one polymer P selected from polyphenylenesulfone and/or polyethersulfone. In one embodiment, polymer P is polyethersulfone.

In one embodiment, UF membranes M comprise additives like polyvinyl pyrrolidones or polyalkylene oxides like polyethylene oxides.

In a preferred embodiment, UF membranes M are prepared using processes according to the invention and comprise as the main component at least one polymer P selected from polysulfones, polyphenylenesulfones or polyethersulfone and further additives like polyvinylpyrrolidone.

In one preferred embodiment, UF membranes M comprise 0.1 to 50% by weight of polyvinylpyrrolidone and 99.9 to 50% by weight of a combination of polyethersulfone and copolymer C.

In another embodiment UF membranes M comprise 5 to 15% by weight of polyvinylpyrrolidone and 95 to 80% by weight of a combination of polyethersulfone and copolymer C.

In one embodiment of the invention, UF membranes M are spiral wound membranes, pillows or flat sheet membranes.

In another embodiment of the invention, UF membranes M are tubular membranes.

In another embodiment of the invention, UF membranes M are hollow fiber membranes or capillaries.

In yet another embodiment of the invention, UF membranes M are single bore hollow fiber membranes.

In yet another embodiment of the invention, UF membranes M are multi bore hollow fiber membranes.

Multiple channel membranes, also referred to as multibore membranes, comprise more than one longitudinal channels also referred to simply as "channels".

In a preferred embodiment, the number of channels is typically 2 to 19. In one embodiment, multiple channel membranes comprise two or three channels. In another embodiment, multiple channel membranes comprise 5 to 9 channels. In one preferred embodiment, multiple channel membranes comprise seven channels.

In another embodiment the number of channels is 20 to 100.

The shape of such channels, also referred to as "bores", may vary. In one embodiment, such channels have an essentially circular diameter. In another embodiment, such channels have an essentially ellipsoid diameter. In yet another embodiment, channels have an essentially rectangular diameter.

In some cases, the actual form of such channels may deviate from the idealized circular, ellipsold or rectangular form.

Normally, such channels have a diameter (for essentially circular diameters), smaller diameter (for essentially ellipsoid diameters) or smaller feed size (for essentially rectangular diameters) of 0.05 mm to 3 mm, preferably 0.5 to 2 mm, more preferably 0.9 to 1.5 mm. In another preferred embodiment, such channels have a diameter (for essentially circular diameters), smaller diameter (for essentially ellipsoid diameters) or smaller feed size (for essentially rectangular diameters) in the range from 0.2 to 0.9 mm.

For channels with an essentially rectangular shape, these channels can be arranged in a row.

For channels with an essentially circular shape, these channels are in a preferred embodiment arranged such that a central channel is surrounded by the other channels. In one preferred embodiment, a membrane comprises one central channel and for example four, six or 18 further channels arranged cyclically around the central channel.

The wall thickness in such multiple channel membranes is normally from 0.02 to 1 mm at the thinnest position, preferably 30 to 500 µm, more preferably 100 to 300 µm.

Normally, the membranes M and carrier membranes that are part of other membranes M have an essentially circular, ellipsoid or rectangular diameter. Preferably, membranes according to the invention are essentially circular.

In one preferred embodiment, membranes M have a diameter (for essentially circular diameters), smaller diameter (for essentially ellipsoid diameters) or smaller feed size (for essentially rectangular diameters) of 2 to 10 mm, preferably 3 to 8 mm, more preferably 4 to 6 mm.

In another preferred embodiment, membranes M have a diameter (for essentially circular diameters), smaller diameter (for essentially ellipsoid diameters) or smaller feed size (for essentially rectangular diameters) of 2 to 4 mm.

In one embodiment the rejection layer is located on the inside of each channel of said multiple channel membrane.

In one embodiment, the channels of a multibore membrane may incorporate an active layer with a pore size different to that of the carrier membrane or a coated layer forming the active layer. Suitable materials for the coated layer are polyoxazoline, polyethylene glycol, polystyrene, hydrogels, polyamide, zwitterionic block copolymers, such as sulfobetaine or carboxybetaine. The active layer can have a thickness in the range from 10 to 500 nm, preferably from 50 to 300 nm, more preferably from 70 to 200 nm.

Preferably multi bore membranes are designed with pore sizes between 0.2 and 0.01 µm. In such embodiments the inner diameter of the capillaries can lie between 0.1 and 8 mm, preferably between 0.5 and 4 mm and particularly preferably between 0.9 and 1.5 mm. The outer diameter of the multi bore membrane can lie between 1 and 26 mm, preferred 2.3 and 14 mm and particularly preferred between 3.6 and 6 mm. Furthermore, the multi bore membrane can contain 2 to 94, preferably 3 to 19 and particularly preferred between 3 and 14 channels. Often multi bore membranes contain seven channels. The permeability range can for example lie between 100 and 10000 $L/m^2$ hbar, preferably between 300 and 2000 $L/m^2$ hbar.

Typically multi bore membranes of the type described above are manufactured by extruding a polymer, which forms a semi-permeable membrane after coagulation through an extrusion nozzle with several hollow needles. A coagulating liquid is injected through the hollow needles into the extruded polymer during extrusion, so that parallel continuous channels extending in extrusion direction are formed in the extruded polymer. Preferably the pore size on an outer surface of the extruded membrane is controlled by bringing the outer surface after leaving the extrusion nozzle in contact with a mild coagulation agent such that the shape is fixed without active layer on the outer surface and subsequently the membrane is brought into contact with a strong coagulation agent. As a result a membrane can be obtained that has an active layer inside the channels and an outer surface, which exhibits no or hardly any resistance against liquid flow. Herein suitable coagulation agents include solvents and/or non-solvents. The strength of the coagulations may be adjusted by the combination and ratio of non-solvent/solvent. Coagulation solvents are known to the person skilled in the art and can be adjusted by routine experiments. An example for a solvent based coagulation agent is N-methylpyrrolidone. Non-solvent based coagulation agents are for instance water, iso-propanol and propylene glycol.

MF membranes are normally suitable for removing particles with a particle size of 0.1 µm and above.

MF membranes normally have an average pore diameter of 0.05 µm to 10 µm, preferably 1.0 µm to 5 µm.

Microfiltration can use a pressurized system but it does not need to include pressure.

MF membranes M can be hollow fibers, capillaries, flat sheet, tubular, spiral wound, pillows, hollow fine fiber or track etched. They are porous and allow water, monovalent species (Na+, Cl−), dissolved organic matter, small colloids and viruses through but retain particles, sediment, algae or large bacteria.

Microfiltration systems are designed to remove suspended solids down to 0.1 micrometers in size, in a feed solution with up to 2-3% in concentration.

In one embodiment of the invention, MF membranes M are prepared using processes according to the invention and comprise as the main component at least one polymer P selected from polysulfone, polyphenylenesulfone and/or polyethersulfone.

Processes according to the invention are economical and easy to carry out.

Processes according to the invention allow for the manufacture of membranes in above lab-scale. Processes according to the invention allow for the manufacture of membranes comprising copolymers C with a high hydrophilicity without having to isolate in substance such copolymers C. Membranes prepared according to the invention also offer excellent mechanical properties like good tensile strength and elongation at break.

Membranes prepared according to the invention also offer excellent separation characteristics, for example with respect to the pure water permeation and the molecular weight cutoff.

Membranes prepared according to the invention also show only little fouling.

Processes according to the invention allow for the manufacture of membranes M with excellent properties as specified below.

Membranes M show a low contact angle when contacted with water. Thus, membranes according to the invention are easily wettable with water.

Membranes M have a high upper glass transition temperature. The term "upper glass transition temperature" herein shall mean the highest glass transition temperature of a polymer or a membrane, in case the polymer or membrane has more than one glass transition temperature.

Membranes M are easy to make and to handle, are able to stand high temperatures and can for example be subjected to vapor sterilization.

Membranes M have a high flexibility.

Furthermore, membranes M have very good dimensional stabilities, high heat distortion resistance, good mechanical properties and good flame retardance properties and biocompatibility. They can be processed and handled at high temperatures, enabling the manufacture of membranes and membrane modules that are exposed to high temperatures and are for example subjected to disinfection using steam, water vapor or higher temperatures, for example above 100° C. of above 125° C.

Membranes M show excellent properties with respect to the decrease of flux through a membrane over time and their fouling and biofouling properties.

Membranes M are easy and economical to make.

Filtration systems and membranes M can be made using aqueous or alcoholic systems and are thus environmentally friendly. Furthermore, leaching of toxic substances is not problematic with membranes M.

Membranes M have a long lifetime.

Another aspect of the invention are membrane elements comprising membranes M.

A "membrane element", herein also referred to as a "filtration element", shall be understood to mean a membrane arrangement of at least one single membrane body. A filtration element can either be directly used as a filtration module or be included in a membrane module. A membrane module, herein also referred to as a filtration module, comprises at least one filtration element. A filtration module normally is a ready to use part that in addition to a filtration element comprises further components required to use the filtration module in the desired application, such as a module housing and the connectors. A filtration module shall thus be understood to mean a single unit which can be installed in a membrane system or in a membrane treatment plant. A membrane system herein also referred to as a filtration system is an arrangement of more than one filtration module that is connected to each other. A filtration system is implemented in a membrane treatment plant.

In many cases, filtration elements comprise more than one membrane arrangement and may further comprise more components like an element housing, one or more bypass tubes, one or more baffle plates, one or more perforated inner tubes or one or more filtrate collection tube. For hollow fiber or multibore membranes, for example, a filtration element normally comprises more than one hollow fiber or multibore membrane arrangement that have been fixed to an outer shell or housing by a potting process. Filtration elements that have been subjected to potting can be fixed on one end or on both ends of the membrane arrangement to the outer shell or housing.

In one embodiment, filtration elements or filtration modules according to the invention discharge permeate directly through an opening in the tube housing or indirectly through a discharge tube located within the membrane element. Particularly when indirect discharge is facilitated the discharge tube can for example be placed in the center of the membrane element and the capillaries of the membrane element are arranged in bundles surrounding the discharge tube.

In another embodiment, a filtration element for filtering comprises an element housing, wherein at least one membrane arrangement and at least one permeate collecting tube are arranged within the element housing and wherein the at least one permeate collecting tube is arranged in an outer part of the filtration element.

The permeate collecting tube inside filtration elements or filtration modules may in one embodiment have cylindrical shape, wherein the cross-section may have any shape such as round, oval, triangular, square or some polygon shape. Preferred is a round shape, which leads to enhanced pressure resistance. Preferably the longitudinal center line of the at least one permeate collecting tube is arranged parallel to the longitudinal center line of the membrane element and the element housing. Furthermore, a cross-section of the permeate collecting tube may be chosen according to the permeate volume produced by the membrane element and pressure losses occurring in the permeate collecting tube. The diameter of the permeate collecting tube may be less than half, preferred less than a third and particularly preferred less than a quarter of the diameter of the element housing.

The permeate collecting tube and the membrane element may have different or the same shape. Preferably the permeate collecting tube and the membrane element have the same shape, particularly a round shape. Thus, the at least one permeate collecting tube can be arranged within the circumferential ring extending from the radius of the element housing to half, preferred a third and particularly preferred a quarter of the radius of the element housing.

In one embodiment the permeate collecting tube is located within the filtration element such that the permeate collecting tube at least partially touches the element housing. This allows placing the filtration element in the filtration module or system such that the permeate collecting tube is arranged substantially at the top of the filtration element in horizontal arrangement. In this context substantially at the top includes any position in the outer part of the membrane that lies within ±45°, preferred ±10° from a vertical center axis in a transverse plane of the filtration element. Here the vertical center axis in a transverse plane is perpendicular to the horizontal center axis in the transverse plane and to the longitudinal center axis extending along the long axis of the filtration element. By arranging the permeate collecting tube this way, air residing within the membrane element before start-up of the filtration module or system can be collected in the permeate collecting tube, which can then easily be vented upon start up by starting the filtration operation. In particular, air pockets can be displaced by permeate which is fed to the filtration module or system and filtered by the membrane element on start up. By releasing air from the filtration module or system the active area of the membrane element increases, thus increasing the filtering effect. Furthermore the risk of fouling due to trapped air pockets decreases and pressure surges as well as the risk of breakage of the membrane element are minimized.

In another embodiment of the filtration element at least two permeate collecting tubes may be arranged in the filtration element, particularly within the element housing. By providing more than one permeate collecting tube the output volume of permeate at a constant pressure can be increased and adjusted to the permeate volume produced by the membrane element. Furthermore the pressure loss is reduced if high backwashing flows are required. Here at least one first permeate collecting tube is arranged in the outer part of the filtration element and at least one second permeate collecting tube can be arranged in the inner or the outer part of the filtration element. For example, two permeate collecting tubes may be arranged in the outer part or one first permeate collecting tube may be arranged in the outer part and another second permeate collecting tube may be arranged in the inner part of the filtration element.

Preferably at least two permeate collecting tubes are arranged opposite each other in the outer part or the outer circumferential ring of the filtration element. By providing at least two permeate collecting tubes opposite each other in the outer part of the filtration element, the filtration element can be placed in a filtration module or system such that one of the tubes are arranged substantially at the top of the element while the other tube is arranged substantially at the bottom. This way ventilation can be achieved through the top tube, while the additional bottom tube increases output volume at a constant pressure.

In another embodiment the filtration element further comprises a perforated tube arranged around the membrane element, in particular composing at least one membrane arrangement comprising at least one hollow fiber membrane. The perforations may be formed by holes or other openings located in regular or irregular distances along the tube. Preferably, the membrane element, in particular the membrane arrangement is enclosed by the perforated tube. With the perforated tube the axial pressure distribution along the filtration element can be equalized in filtration and back washing operation. Thus, the permeate flow is evenly distributed along the filtration element and hence the filtering effect can be increased.

In another embodiment the perforated tube is arranged such that an annular gap is formed between the element housing and the perforated tube. Known membrane elements do not have a distinct border and the membrane element are directly embedded in a housing of the filtration element. This leads to an uneven pressure distribution in axial direction as the axial flow is disturbed by the membrane element.

In another embodiment the membrane element comprises multibore membranes. The multi bore membranes preferably comprise more than one capillary, which runs in a channel along the longitudinal axis of the membrane element or the filtration element. Particularly, the multi bore membrane comprises at least one substrate forming the channels and at least one active layer arranged in the channels forming the capillaries. Embedding the capillaries within a substrate allows forming a multi bore membrane, which are considerably easier to mount and mechanically more stable than membranes based on single hollow fibers. As a result of the mechanical stability, the multi bore membrane is particularly suitable for cleaning by back washing, where the filtration direction is reversed such that a possible fouling layer formed in the channels is lifted and can be removed. In combination with the arrangements of the permeate colleting tube leading to an even pressure distribution within the membrane element, the overall performance and stability of the filtration element is further enhanced.

In contrast to designs with a central discharge tube and single bore membranes, the distribution of the multi bore membranes is advantageous in terms of producing lower pressure loss in both operational modes filtration and backwash. Such designs further increases stability of the capillaries by equalizing the flow or pressure distribution across the membrane element. Thus, such designs avoid adverse effects on the pressure distribution among the capillaries of the membrane element. For designs with a central permeate collecting tube permeate flows in filtration mode from the outer capillaries of the membrane to the inner capillaries and has to pass a decreasing cross-section. In backwashing mode the effect reverses in that sense, that the flow volume decreases towards the outer capillaries and thus the cleaning effect decreases towards the outside as well. In fact the uneven flow and pressure distribution within the membrane element leads to the outer capillaries having a higher flow in filtration mode and hence building up more fouling layer than the inner capillaries. In backwashing mode, however, this reverses to the contrary with a higher cleaning effect for the inner capillaries, while the outer exhibit a higher build up. Thus the combination of the permeate collecting tube in the outer part of the filtration element and the use of the multi-bore membrane synergistically lead to a higher long-term stability of the filtration element.

Another aspect of the invention are membrane modules comprising membranes M.

In one embodiment, membrane modules according to the invention comprise a filtration element which is arranged within a module housing. The raw water is at least partly filtered through the filtration element and permeate is collected inside the filtration module and removed from the filtration module through an outlet. In one embodiment the filtrate (also referred to as "permeate") is collected inside the filtration module in a permeate collection tube. Normally the element housing, optionally the permeate collecting tube and the membrane arrangement are fixed at each end in membrane holders comprising a resin, preferably an epoxy resin, in which the filtration element housing, the membranes, preferably multibore membranes, and optionally the filtrate collecting tube are embedded.

Membrane modules can in one embodiment for example have cylindrical shape, wherein the cross-section can have any shape such as round, oval, triangular, square or some polygon shape. Preferred is a round shape, which leads to a more even flow and pressure distribution within the membrane element and avoids collection of filtered material in certain areas such as corners for e.g. square or triangular shapes.

In one embodiment, membrane modules according to the invention have an inside-out configuration ("inside feed") with the filtrate flowing from the inside of a hollow fiber or multibore membrane to the outside.

In one embodiment, membrane modules according to the invention have an outside-in filtration configuration ("outside feed").

In a preferred embodiment, membranes, filtration elements, filtration modules and filtration systems according to the invention are configured such that they can be subjected to backwashing operations, in which filtrate is flushed through membranes in opposite direction to the filtration mode.

In one embodiment, membrane modules according to the invention are encased.

In another embodiment, membrane modules according to the invention are submerged in the fluid that is to be subjected to filtration.

In one embodiment, membranes, filtration elements, filtration modules and filtration systems according to the invention are used in membrane bioreactors.

In one embodiment, membrane modules according to the invention have a dead-end configuration and/or can be operated in a dead-end mode.

In one embodiment, membrane modules according to the invention have a crossflow configuration and/or can be operated in a crossflow mode.

In one embodiment, membrane modules according to the invention have a directflow configuration and/or can be operated in a directflow mode.

In one embodiment, membrane modules according to the invention have a configuration that allow the module to be cleaned and scoured with air.

In one embodiment, filtration modules include a module housing, wherein at least one filtration element as described above is arranged within the module housing. Hereby the filtration element is arranged vertically or horizontally. The module housing is for instance made of fiber reinforced plastic (FRP) or stainless steel.

In one embodiment the at least one filtration element is arranged within the module housing such that the longitudinal center axis of the filtration element and the longitudinal center axis of the housing are superimposed. Preferably the filtration element is enclosed by the module housing, such that an annular gap is formed between the module housing and the element housing. The annular gap between the element housing and the module housing in operation allow for an even pressure distribution in axial direction along the filtration module.

In another embodiment the filtration element is arranged such that the at least one permeate collecting tube is located substantially at the top of the filtration module or filtration element. In this context substantially at the top includes any position in the outer part of the membrane element that lies within ±45°, preferred ±10°, particularly preferred ±5° from a vertical center axis in a transverse plane of the filtration element. Furthermore, the vertical center axis in a transverse plane is perpendicular to the horizontal center axis in the transverse plane and to the longitudinal center axis extending along the long axis of the filtration element. By arranging the permeate collecting tube this way, air residing within the filtration module or system before start up can be collected in the permeate collecting tube, which can then easily be vented upon start up by starting the filtration operation. In particular, air pockets can be displaced by permeate, which is fed to the filtration module or system on start up. By releasing air from the filtration module or system the active area of the membrane element is increased, thus increasing the filtering effect. Furthermore, the risk of fouling due to trapped air pockets decreases. Further preferred the filtration module is mount horizontally in order to orientate the permeate collecting tube accordingly.

In another embodiment the filtration element is arranged such that at least two permeate collecting tubes are arranged opposite each other in the outer part of the filtration element. In this embodiment the filtration module can be oriented such that one of the permeate collecting tubes are arranged substantially at the top of the filtration element, while the other tube is arranged substantially at the bottom of the filtration element. This way the ventilation can be achieved through the top tube, while the bottom tube allows for a higher output volume at a constant pressure. Furthermore, the permeate collecting tubes can have smaller dimensions compared to other configurations providing more space to be filled with the membrane element and thus increasing the filtration capacity.

In one embodiment, membrane modules according to the invention can have a configuration as disclosed in WO 2010/121628, p. 3, ln. 25 to p. 9, ln 5 and especially as shown in FIG. 2 and FIG. 3 of WO 2010/121628.

In one embodiment membrane modules according to the invention can have a configuration as disclosed in EP 937 492, [0003] to [0020].

In one embodiment membrane modules according to the invention are capillary filtration membrane modules comprising a filter housing provided with an inlet, an outlet and a membrane compartment accommodating a bundle of membranes according to the invention, said membranes being cased at both ends of the membrane module in membrane holders and said membrane compartment being provided with discharge conduits coupled to the outlet for the conveyance of the permeate. In one embodiment said discharge conduits comprise at least one discharge lamella provided in the membrane compartment extending substantially in the longitudinal direction of the filtration membranes.

Another aspect of the invention are filtration systems comprising membrane modules according to the invention. Connecting multiple filtration modules normally increases the capacity of the filtration system. Preferably the filtration modules and the encompassed filtration elements are mounted horizontally and adapters are used to connect the filtration modules accordingly.

In one embodiment, filtration systems according to the invention comprise arrays of modules in parallel.

In one embodiment, filtration systems according to the invention comprise arrays of modules in horizontal position.

In one embodiment, filtration systems according to the invention comprise arrays of modules in vertical position.

In one embodiment, filtration systems according to the invention comprise a filtrate collecting vessel (like a tank, container).

In one embodiment, filtration systems according to the invention use filtrate collected in a filtrate collecting tank for backwashing the filtration modules.

In one embodiment, filtration systems according to the invention use the filtrate from one or more filtration modules to backwash another filtration module.

In one embodiment, filtration systems according to the invention comprise a filtrate collecting tube.

In one embodiment, filtration systems according to the invention comprise a filtrate collecting tube to which pressurized air can be applied to apply a backwash with high intensity.

In one embodiment, filtration systems according to the invention have a configuration as disclosed in EP 1 743 690, col. 2, ln. 37 to col. 8, ln. 14 and in FIG. 1 to FIG. 11 of EP 1 743 690; EP 2 008 704, col. 2, ln. 30 to col. 5, ln. 36 and FIG. 1 to FIG. 4; EP 2 158 958, col. 3, ln. 1 to col. 6, ln. 36 and FIG. 1.

In one embodiment filtration systems according to the invention comprise more than one filtration modules arranged vertically in a row, on both of whose sides an inflow pipe is arrayed for the fluid to be filtered and which open out individually allocated collecting pipes running lengthwise per row, whereby each filtration module has for the filtrate at least one outlet port which empties into a filtrate collecting pipe, whereby running along the sides of each row of filtration modules is a collecting pipe that has branch pipes allocated to said pipe on each side of the filtration module via which the allocated filtration module is directly connectable, wherein the filtrate collecting pipe runs above and parallel to the upper two adjacent collecting pipes.

In one embodiment, filtration systems according to the invention comprise a filtrate collecting pipe that is connected to each of the filtration modules of the respective filtration system and that is designed as a reservoir for backwashing the filtration system, wherein the filtration system is configured such that in backwashing mode pressurized air is applied to the filtrate collecting pipe to push permeate water from the permeate collecting pipe through the membrane modules in reverse direction.

In one embodiment, filtration systems according to the invention comprise a plurality of module rows arranged in parallel within a module rack and supplyable with raw water through supply/drain ports and each end face via respectively associated supply/drain lines and each including a drain port on a wall side for the filtrate, to which a filtrate collecting line is connected for draining the filtrate, wherein valve means are provided to control at least one filtration and backwashing mode, wherein, in the backwashing mode, a supply-side control valve of the first supply/drain lines carrying raw water of one module row is closed, but an associated drain-side control valve of the other supply/drain line of one module row serving to drain backwashing water is open, whereas the remaining module rows are open, to ensure backwashing of the one module row of the module rack by the filtrate simultaneously produced by the other module rows.

Hereinafter, when reference is made to the use of "membranes" for certain applications, this shall include the use of the membranes as well as filtration elements, membrane modules and filtration systems comprising such membranes and/or membrane modules.

In a preferred embodiment, membranes M are used for the treatment of sea water or brackish water.

In one preferred embodiment of the invention, membranes M, particularly RO, FO or NF membranes are used for the desalination of sea water or brackish water.

Membranes M, particularly RO, FO or NF membranes are used for the desalination of water with a particularly high salt content of for example 3 to 8% by weight. For example membranes M are suitable for the desalination of water from mining and oil/gas production and fracking processes, to obtain a higher yield in these applications.

Different types of membrane M can also be used together in hybrid systems combining for example RO and FO membranes, RO and UF membranes, RO and NF membranes, RO and NF and UF membranes, NF and UF membranes.

In another preferred embodiment, membranes M, particularly NF, UF or MF membranes, are used in a water treatment step prior to the desalination of sea water or brackish water.

In another preferred embodiment membranes M, particularly NF, UF or MF membranes are used for the treatment of industrial or municipal waste water.

Membranes M, particularly RO and/or FO membranes can be used in food processing, for example for concentrating, desalting or dewatering food liquids (such as fruit juices), for the production of whey protein powders and for the concentration of milk, the UF permeate from making of whey powder, which contains lactose, can be concentrated by RO, wine processing, providing water for car washing, making maple syrup, during electrochemical production of hydrogen to prevent formation of minerals on electrode surface, for supplying water to reef aquaria.

Membranes M, particularly UF membranes can be used in medical applications like in dialysis and other blood treatments, food processing, concentration for making cheese, processing of proteins, desalting and solvent-exchange of proteins, fractionation of proteins, clarification of fruit juice, recovery of vaccines and antibiotics from fermentation broth, laboratory grade water purification, drinking water disinfection (including removal of viruses), removal of endocrines and pesticides combined with suspended activated carbon pretreatment.

Membranes M, particularly RO, FO, NF membranes can be used for rehabilitation of mines, homogeneous catalyst recovery, desalting reaction processes.

Membranes M, particularly NF membranes, can be used for separating divalent ions or heavy and/or radioactive metal ions, for example in mining applications, homogeneous catalyst recovery, desalting reaction processes.

EXAMPLES

Abbreviations:
DCDPS 4,4'-Dichlorodiphenylsulfone
DHDPS 4,4'-Dihydroxydiphenylsulfone
NMP N-methylpyrrolidone DMAc Dimethylacetamide
PWP pure water permeation
MWCO molecular weight cutoff
Ultrason® E 6020P polyethersulfone with a viscosity number (ISO 307, 1157, 1628; in 0.01 g/mol phenol/1,2 orthodichlorobenzene 1:1 solution) of 82; a glass transition temperature (DSC, 10° C./min; according to ISO 11357-1/-2) of 225° C.; a molecular weight Mw (GPC in DMAc, PMMA standard): 75000 g/mol
Luvitec® K40 polyvinylpyrrolidone with a Polyvinylpyrrolidone with a solution viscosity characterised by the K-value of 40, determined according to the method of Fikentscher (Fikentscher, Cellulosechemie 13, 1932 (58))

The viscosity of copolymers was measured as a 1% by weight solution of the copolymer in NMP at 25° C. according to DIN EN ISO 1628-1.

For characterizing copolymers C obtained in the examples, 20 ml of the solution comprising copolymers C obtained in the examples were treated with 500 ml ethanol to precipitate copolymer C. The so obtained precipitate was washed three times with 100 ml Ethanol and dried at 40° C. and 20 mbar. This procedure was also used to isolate sufficient amounts of Copolymers 1 and 2 for comparative trials.

The molecular weight distribution and the average molecular weight of the copolymers were determined by GPC measurements in DMAc.

GPC-measurements were done using Dimethylacetamide/ 0.5 wt.-% LiBr as eluent. The concentration of the polymer solution was 4 mg/ml. After filtration (pore size 0.2 µm), 100 µl of this solution was injected in the GPC system. For the separation 4 different columns (heated to 80° C.) were used (GRAM pre-column, GRAM 30A, GRAM 1000A, GRAM 1000A, separation material: polyester copolymers). The system was operated with a flow rate of 1 ml/min. As detection system a DRI Agilent 1100 was used.

The calibration was done with PMMA-standards with molecular weights (Mn) from 800 to 1820000 g/mol.

The content of polyalkyleneoxide in total or of polyethyleneoxide, polypropyleneoxide or polytetrahydrofurane in the block copolymer was determined using $^1$H-NMR in $CDCl_3$. The signal intensity of resonance signals for H-atoms of polyalkylene groups was compared to the signal intensity of resonance signals for H-atoms of aromatic groups comprised in polyarylene ether blocks. This comparison yields the ratio of polyalkylene oxide to polyarylene ether that can be used to calculate the content of polyalkylene oxide in the copolymer by weight.

The solid content of the solutions obtained in the examples was also determined by $^1$H NMR in $CDCl_3$ by comparing the signal intensities of the solvent protons and protons of the other components.

The ratio of polyalkylene oxide incorporated in the block copolymer is the ratio of the mass of polyalkylene oxide comprised in the block copolymer (determined by NMR, see above) to the mass of polyalkylene oxide used as a starting material.

The glass transition temperature of the products was determined by DSC analysis. All DSC-measurements were done using a DSC 2000 of TA Instruments at a heating rate of 20 k/min. About 5 mg material were placed in an Aluminum vessel and sealed. In the first run, the samples were heated to 250° C., rapidly cooled to −100° C. and then in the second run heated to 250° C. The Tg-values given were determined in the second run.

The completion of the polymerization reaction was monitored via HPLC as follows: 0.5 ml of the reaction mixture was mixed with 3 ml DMAc (3 h). After the addition of 12 ml THF, the so obtained mixture was filtered (pore size 0.2 µm) and 2 µl of this solution were injected into a HPLC-system with a C-18 column (80° C.). The system was operated starting with a 98/2 mixture of water/THF which changed within 3 min to a 50/50 mixture. Then the eluent changed to THF within 6 min. The flow rate was 3 ml/min. For detection a Varian ELSD 2100 detector was used.

Preparation of Copolymers:

Example 1

In a 4 liter glass reactor fitted with a thermometer, a gas inlet tube and a Dean-Stark-trap, 287.17 g of DCDPS, 203.89 g of DHDPS, 608.99 g of α-$C_{16}$/$C_{18}$-alkyl,ω-hydroxy-polyethyleneglykol with a molar ratio of $C_{16}$/$C_{18}$ rests of 55:45 and with a number average molecular mass Mn of 3100 g/mol and 145.12 g of potassium carbonate with a volume average particle size of 32.4 µm were suspended in 527 ml NMP in a nitrogen atmosphere.

The mixture was heated to 190° C. within one hour. In the following, the reaction time shall be understood to be the time during which the reaction mixture was maintained at 190° C.

The water that was formed in the reaction was continuously removed by distillation. The solvent level inside the reactor was maintained at a constant level by addition of further NMP.

After a reaction time of six hours, the reaction was stopped by addition of 933 ml of NMP with a temperature of 23° C. Nitrogen was bubbled through the mixture for one hour with a rate of 20 l/h and the mixture was let to cool to room temperature. The potassium chloride formed in the reaction was removed by filtration. The solid content of the so obtained solution was 31% by weight.

Example 2

In a 4 liter glass reactor fitted with a thermometer, a gas inlet tube and a Dean-Stark-trap, 287.17 g of DCDPS, 235.16 g of DHDPS, 236 g of α-$C_{16}$/$C_{18}$-alkyl,ω-hydroxy-polyethyleneglykol with a molar ratio of Cis/Cis rests of 55:45 and with a number average molecular mass Mn of 3100 g/mol and 145.12 g of potassium carbonate with a volume average particle size of 32.4 µm were suspended in 527 ml NMP in a nitrogen atmosphere.

The mixture was heated to 190° C. within one hour. In the following, the reaction time shall be understood to be the time during which the reaction mixture was maintained at 190° C.

The water that was formed in the reaction was continuously removed by distillation. The solvent level inside the reactor was maintained at a constant level by addition of further NMP.

After a reaction time of six hours, the reaction was stopped by addition of 933 ml of NMP with a temperature of 23° C. Nitrogen was bubbled through the mixture for one hour with a rate of 20 l/h and the mixture was let to cool to room temperature. The potassium chloride formed in the reaction was removed by filtration. The solid content of the so obtained solution was 28.5% by weight.

Example 3

In a 4 liter glass reactor fitted with a thermometer, a gas inlet tube and a Dean-Stark-trap, 287.17 g of DCDPS, 225.15 g of DHDPS, 328.1 g of α-$C_{16}$/$C_{18}$-alkyl,ω-hydroxy-polyethyleneglykol with a molar ratio of Cis/Cis rests of 55:45 and with a number average molecular mass Mn of 3100 g/mol and 145.12 g of potassium carbonate with a volume average particle size of 32.4 µm were suspended in 527 ml NMP in a nitrogen atmosphere.

The mixture was heated to 190° C. within one hour. In the following, the reaction time shall be understood to be the time during which the reaction mixture was maintained at 190° C.

The water that was formed in the reaction was continuously removed by distillation. The solvent level inside the reactor was maintained at a constant level by addition of further NMP.

After a reaction time of six hours, the reaction was stopped by addition of 933 ml of NMP with a temperature of 23° C. Nitrogen was bubbled through the mixture for one hour with a rate of 20 l/h and the mixture was let to cool to room temperature. The potassium chloride formed in the reaction was removed by filtration. The solid content of the so obtained solution was 27% by weight.

Example 4

In a 4 liter glass reactor fitted with a thermometer, a gas inlet tube and a Dean-Stark-trap, 287.19 g of DCDPS, 231.40 g of DHDPS, 320 g of polyethyleneglykol with a number average molecular mass Mn of 8000 g/mol and 145.12 g of potassium carbonate with a volume average particle size of 32.4 µm were suspended in 527 ml NMP in a nitrogen atmosphere.

The mixture was heated to 190° C. within one hour. In the following, the reaction time shall be understood to be the time during which the reaction mixture was maintained at 190° C.

The water that was formed in the reaction was continuously removed by distillation. The solvent level inside the reactor was maintained at a constant level by addition of further NMP.

After a reaction time of six hours, the reaction was stopped by addition of 933 ml of NMP with a temperature of 23° C. Nitrogen was bubbled through the mixture for one hour with a rate of 20 l/h and the mixture was let to cool to room temperature. The potassium chloride formed in the reaction was removed by filtration. The solid content of the so obtained solution was 27% by weight.

Example 5

In a 4 liter glass reactor fitted with a thermometer, a gas inlet tube and a Dean-Stark-trap, 574.16 g of DCDPS, 485.33 g of DHDPS, 186 g of α-$C_{16}$/$C_{18}$-alkyl,ω-hydroxy-polyethyleneglykol with a molar ratio of Cis/Cis rests of 55:45 and with a number average molecular mass Mn of 3100 g/mol and 290.24 g of potassium carbonate with a volume average particle size of 32.4 µm were suspended in 527 ml NMP in a nitrogen atmosphere.

The mixture was heated to 190° C. within one hour. In the following, the reaction time shall be understood to be the time during which the reaction mixture was maintained at 190° C.

The water that was formed in the reaction was continuously removed by distillation. The solvent level inside the reactor was maintained at a constant level by addition of further NMP.

After a reaction time of nine hours, the reaction was stopped by addition of 1947 ml of NMP with a temperature of 23° C. Nitrogen was bubbled through the mixture for one hour with a rate of 20 l/h and the mixture was let to cool to room temperature. The potassium chloride formed in the reaction was removed by filtration. The solid content of the so obtained solution was 31% by weight.

TABLE 1

Analytical data of copolymers prepared in experiments 1 to 5

|  | 1 | 2 | 3 | 4 | 5 |
| --- | --- | --- | --- | --- | --- |
| viscosity number [ml/g] | 19.1 | 40.7 | 27.7 | 34.6 | 64.7 |
| polyalkylene oxide content (% by weight) | 56 | 32.1 | 37.7 | 40.1 | 15.7 |
| content of free polyalkylene oxide (% by weight) | 2.0 | 1.2 | 0.0 | 0.0 | 0.0 |
| Tg [° C.] | −12 | 23 | 15 | 13 | 156 |

Examples M1 to M10

Membrane Preparation

Into a three neck flask equipped with a magnetic stirrer 76 ml of N-methylpyrrolidone (NMP), 5 g of polyvinylpyrrolidone (PVP, Luvitec® K40) and 19 g of polyethersulfone (PESU, Ultrason® E 6020P) were added. By replacing a part of the polyethersulfone by copolymer C in the amounts given in table 2, the mixtures with the compositions given in table 2 were prepared. The mixture was heated under gentle stirring at 60° C. until a homogeneous clear viscous solution was obtained. The solution was degassed overnight at room temperature. After that the membrane solution was reheated at 60° C. for 2 hours and casted onto a glass plate with a casting knife (300 microns) at 60° C. using an Erichsen Coating machine operating at a speed of 5 mm/min. The membrane film was allowed to rest for 30 seconds before immersion in a water bath at 25° C. for 10 minutes.

After the membrane had detached from the glass plate, the membrane was carefully transferred into a water bath for 12 h. Afterwards the membrane was transferred into a bath containing 2500 ppm NaOCl at 50° C. for 4.5 h to remove PVP. After that process the membrane was washed with water at 60° C. and the one time with a 0.5 wt.-% solution of NaBisulfite to remove active chlorine. After several washing steps with water the membrane was stored wet until characterization started.

A flat sheet continuous film with micro structural characteristics of UF membranes having dimension of at least 10×15 cm size was obtained. The membrane had a top thin skin layer (1-3 microns) and a porous layer underneath (thickness: 100-150 microns).

Membrane Characterization:

Using a pressure cell with a diameter of 60 mm, the pure water permeation of the membranes was tested using ultra-pure water (salt-free water, filtered by a Millipore UF-system). In a subsequent test, a solution of different PEG-Standards was filtered at a pressure of 0.15 bar. By GPC-measurement of the feed and the permeate, the molecular weight cut-off was determined.

The fouling performance was tested by treating the membrane sample with a solution containing 0.5 wt.-% BSA for 3 h. After that time the membrane was washed three times with 100 ml VE-water. After that, the flux measurement was run a second time. The ratio between the PWP after BSA-treatment and before BSA treatment is given as fouling ratio (FR in [%]). The data obtained is summarized in table 2.

TABLE 2

Composition and characterization of membranes M1 to M10

| | M1 | M2 | M3 | M4 | M5 | M6 | M7 | M8 | M9 | M10 |
|---|---|---|---|---|---|---|---|---|---|---|
| PESU [wt-%] | 19 | 16.6 | 14.25 | 16.6 | 14.25 | 16.6 | 14.25 | 16.6 | 14.25 | |
| Copolymer 1 [wt-%] | | 3.4 | 4.75 | | | | | | | |
| Copolymer 2 [wt-%] | | | | 3.4 | 4.75 | | | | | |
| Copolymer 3 [wt-%] | | | | | | 3.4 | 4.75 | | | |
| Copolymer 4 [wt-%] | | | | | | | | 3.4 | 4.75 | |
| Copolymer 5 [wt-%] | | | | | | | | | | 19 |
| PVP | 5 | 5 | 5 | 5 | 5 | 5 | 5 | 5 | 5 | 5 |
| NMP | 76 | 76 | 76 | 76 | 76 | 76 | 76 | 76 | 76 | 76 |
| PWP [l/h * bar * m$^2$] | 670 | 970 | 1120 | 880 | 1020 | 910 | 1060 | 940 | 1160 | 790 |
| MWCO [kg/mol] | 71 | 67 | 68 | 63 | 65 | 59 | 66 | 63 | 71 | 67 |
| FR [%] | 10 | 53 | 61 | 43 | 44 | 46 | 47 | 45 | 49 | 34 |

Membranes according to the invention have improved fouling properties over comparative example M1 and M10. They also offer improved water permeability.

Mechanical Testing:

Samples according to M3C and M5C were prepared analogously to membranes M3 and M5 but using precipitated copolymers C 1 and C 2 in solid form obtained by treating 20 ml of the solution obtained according to example 1 or 2 comprising copolymers C with 500 ml ethanol to precipitate copolymer C. The so obtained precipitate was washed three times with 100 ml Ethanol and dried at 40° C. and 20 mbar. The obtained polymer was wax-like.

For mechanical testing, 5 samples of probe type 5A were punched out of the membranes and stored wet at 23° C. and 50% relative humidity prior to testing. Testing was done according to ISO 527-1 with an Instron testing machine using a 100 N force probe at a speed of 50 mm/min.

TABLE 3

Composition and mechanical properties of membranes

| | M3 | M5 | M3C | M5C |
|---|---|---|---|---|
| PESU | 14.25 | 14.25 | 14.25 | 14.25 |
| Copolymer 1 (solution) [wt.-%] | 4.75 | | | |
| Copolymer 2 (solution) [wt.-%] | | 4.75 | | |
| Copolymer 1 (solid) [wt.-%] | | | 4.75 | |
| Copolymer 2 (solid) [wt.-%] | | | | 4.75 |
| PVP [wt.-%] | 5 | 5 | 5 | 5 |
| NMP [wt.-%] | 76 | 76 | 76 | 76 |
| Tensile Strength [MPa] | 2.9 | 3.1 | 2.7 | 2.6 |
| Elongation at break [%] | 28 | 29 | 19 | 18 |

The invention claimed is:

1. A process for making a membrane M, the process comprising:
    a) preparing a copolymer C, wherein said copolymer C comprises blocks of at least one polyarylene ether A and blocks of polyalkylene oxide PAO, wherein the content of polyalkylene oxide PAO in copolymer C is 30 to 90% by weight and wherein copolymer C is prepared in a solvent L to yield solution S;
    b) providing a dope solution D comprising at least one polymer P;
    c) mixing the solution S obtained in the preparation of copolymer C and the dope solution D to obtain a mixture; and
    d) preparing a membrane by bringing the mixture of the solution S and the dope solution D into contact with at least one coagulating agent.

2. The process according to claim 1, wherein said block of at least one polyarylene ether A is selected from the group consisting of a polyethersulfone, a polysulfone, a polyphenylenesulfone, and copolymers or mixtures thereof.

3. The process according to claim 1, wherein said polymer P is selected from the group consisting of a polyethersulfone, a polysulfone and a polyphenylenesulfone.

4. The process of claim 1, wherein said polyalkylene oxide is polyethylene oxide.

5. The process of claim 1, wherein said solvent L is NMP.

6. The process of claim 1, wherein said at least one coagulating agent comprises water.

7. The process of claim 1, wherein the membrane M contains the copolymer C and the polymer P in a mass ratio of 1:99 to 1:3.

8. The process of claim 1, wherein said blocks of polyalkylene oxide PAO have an average molecular mass Mn of 150 g/mol to 20000 g/mol.

9. The process of claim 1, wherein said dope solution D further comprises a further additive selected from the group consisting of a polyvinylpyrrolidone, a polyethylene oxide, a phenoxy resin, and mixtures thereof.

10. The process of claim 1, wherein said copolymer C is prepared by reacting aromatic bishalogeno compounds and aromatic biphenols or salts thereof in the presence of at least one suitable base and in the presence of at least one polyalkylene oxide PAO.

11. A membrane obtained by the process of claim 1.

12. A filtration system, comprising the membrane of claim 11.

13. A water treatment method, comprising:
    passing an aqueous medium through the membrane of claim 11.

14. The method of claim 13, wherein the aqueous medium is in the form of:
an industrial or municipal waste,
a sea or brackish water,
a dialysis sample,
a plasmolysis sample, or
a food to be processed.

15. The process of claim 1, wherein
said block of at least one polyarylene ether A is selected from the group consisting of a polyethersulfone, a polysulfone, a polyphenylenesulfone, and copolymers or mixtures thereof,
said polymer P is selected from the group consisting of a polyethersulfone, a polysulfone and a polyphenylenesulfone,
said polyalkylene oxide is polyethylene oxide, and
said solvent L is NMP.

* * * * *

UNITED STATES PATENT AND TRADEMARK OFFICE
CERTIFICATE OF CORRECTION

| | | |
|---|---|---|
| PATENT NO. | : 10,441,925 B2 | Page 1 of 2 |
| APPLICATION NO. | : 15/502896 | |
| DATED | : October 15, 2019 | |
| INVENTOR(S) | : Martin Weber et al. | |

It is certified that error appears in the above-identified patent and that said Letters Patent is hereby corrected as shown below:

In the Specification

In Columns 3-4, structure IVd, " 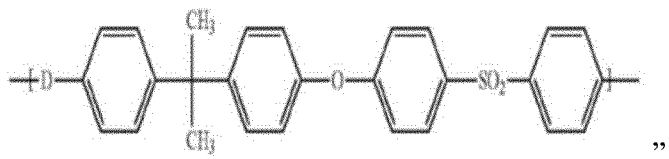 "

should read -- 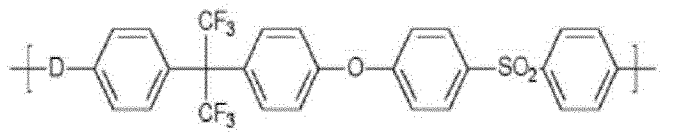 --.

In Column 8, Line 31, "the as" should read -- as the --.

In Column 11, Line 3, "C" should read -- C. --.

In Column 14, Line 3, "surface" should read -- surface. --.

In Column 15, Line 66, "ellipsold" should read -- ellipsoid --.

In Column 25, Line 13, "(58))" should read -- (58)). --.

In Column 25, Line 38, "polytetrahydrofurane" should read -- polytetrahydrofuran --.

In Column 26, Line 11, "polyethyleneglykol" should read -- polyethyleneglycol --.

In Column 26, Line 35, "polyethyleneglykol" should read -- polyethyleneglycol --.

In Column 26, Line 35, "Cis/Cis" should read -- $C_{16}/C_{18}$ --.
In Column 26, Line 60, "polyethyleneglykol" should read -- polyethyleneglycol --.

Signed and Sealed this
Seventh Day of April, 2020

Andrei Iancu
*Director of the United States Patent and Trademark Office*

CERTIFICATE OF CORRECTION (continued)
U.S. Pat. No. 10,441,925 B2

In Column 26, Line 60, "Cis/Cis" should read -- $C_{16}/C_{18}$ --.

In Column 27, Line 18, "polyethyleneglykol" should read -- polyethyleneglycol --.

In Column 27, Line 47, "polyethyleneglykol" should read -- polyethyleneglycol --.

In Column 27, Line 47, "Cis/Cis" should read -- $C_{16}/C_{18}$ --.